June 5, 1951  C. L. MORRIS  2,555,807
WING TIP LIGHTS FOR ROTARY WING AIRCRAFT
Filed Aug. 8, 1946  4 Sheets-Sheet 3
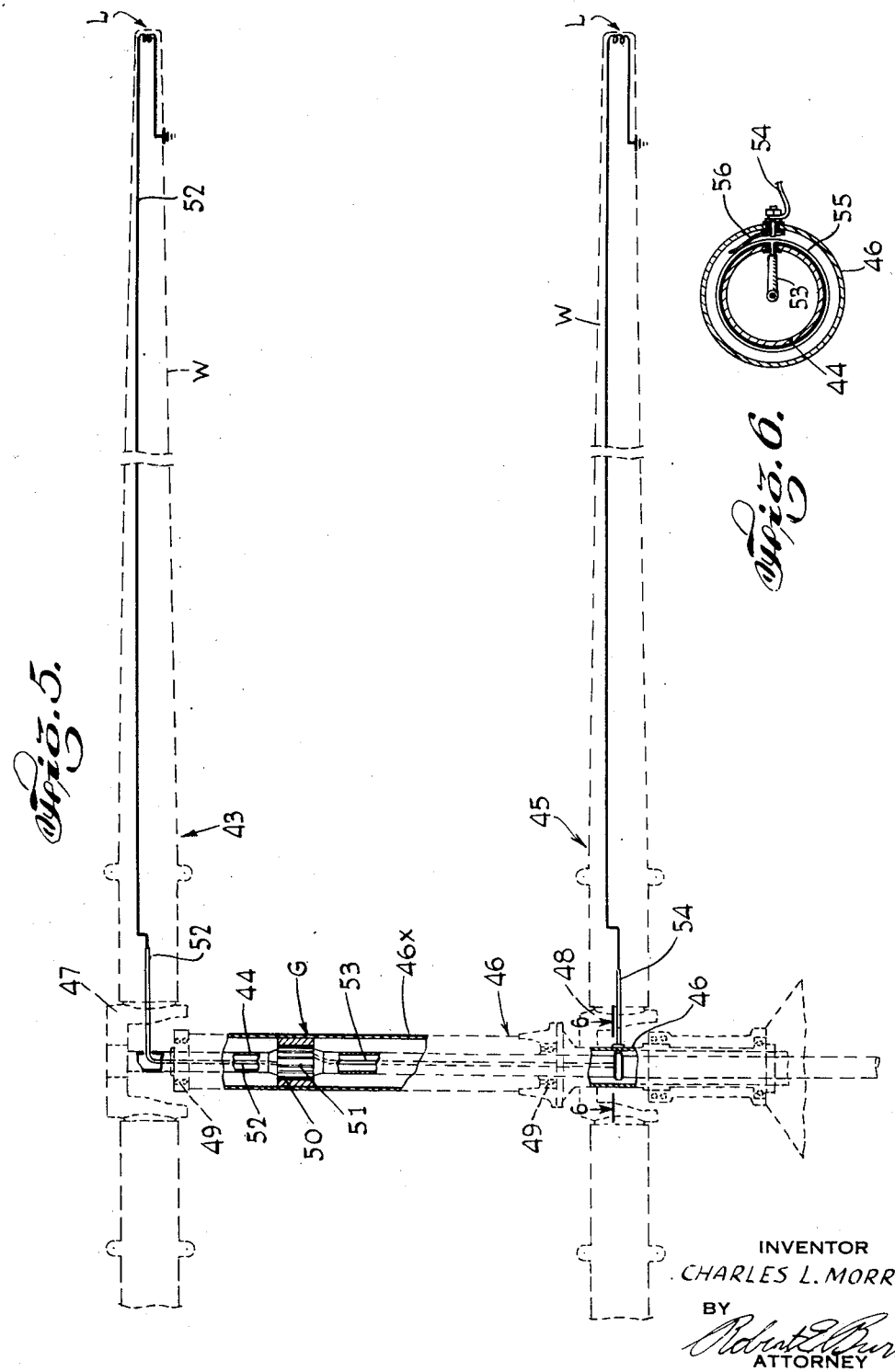
INVENTOR
CHARLES L. MORRIS
BY
ATTORNEY June 5, 1951           C. L. MORRIS           2,555,807
WING TIP LIGHTS FOR ROTARY WING AIRCRAFT
Filed Aug. 8, 1946           4 Sheets-Sheet 4
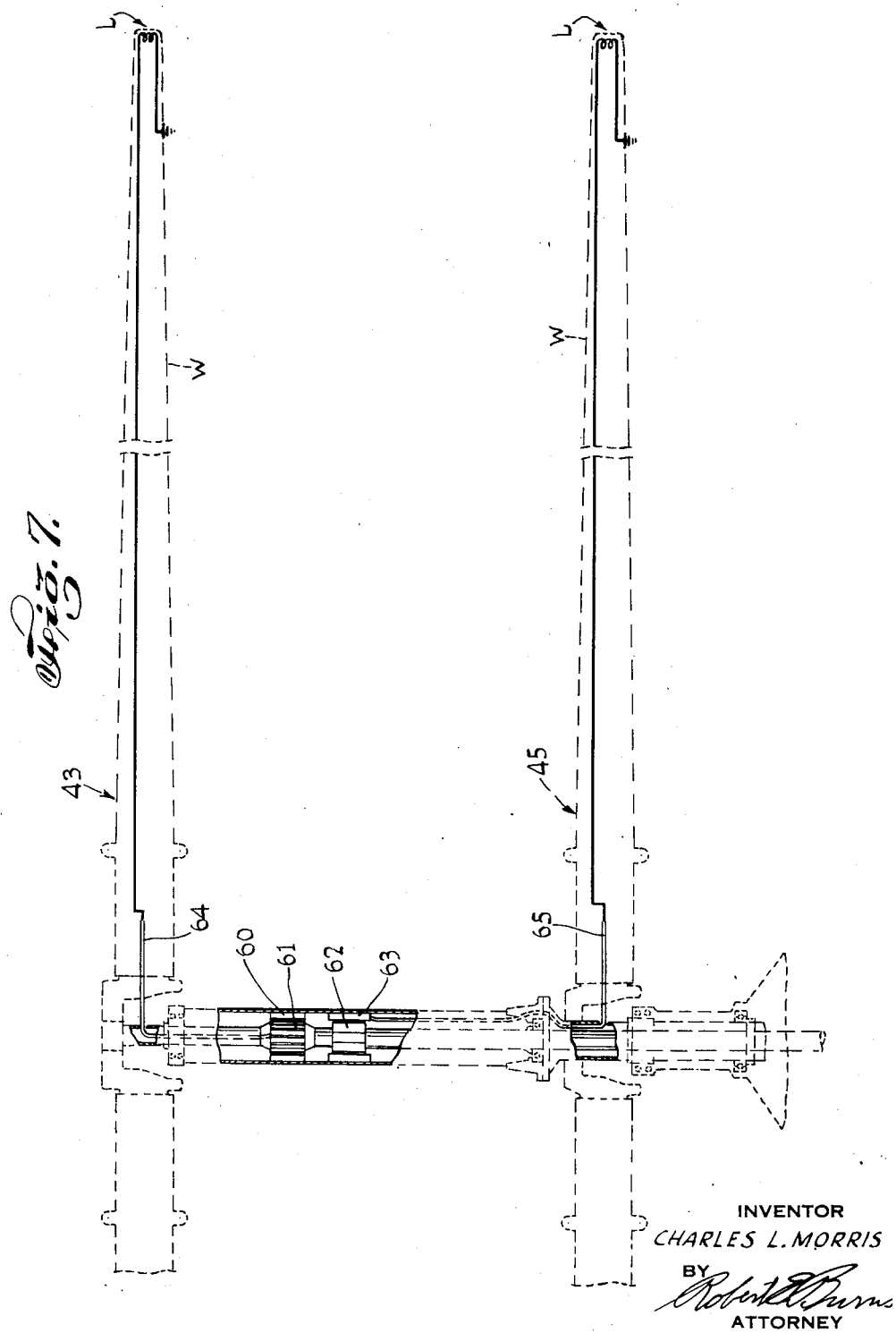
INVENTOR
CHARLES L. MORRIS
BY
ATTORNEY Patented June 5, 1951

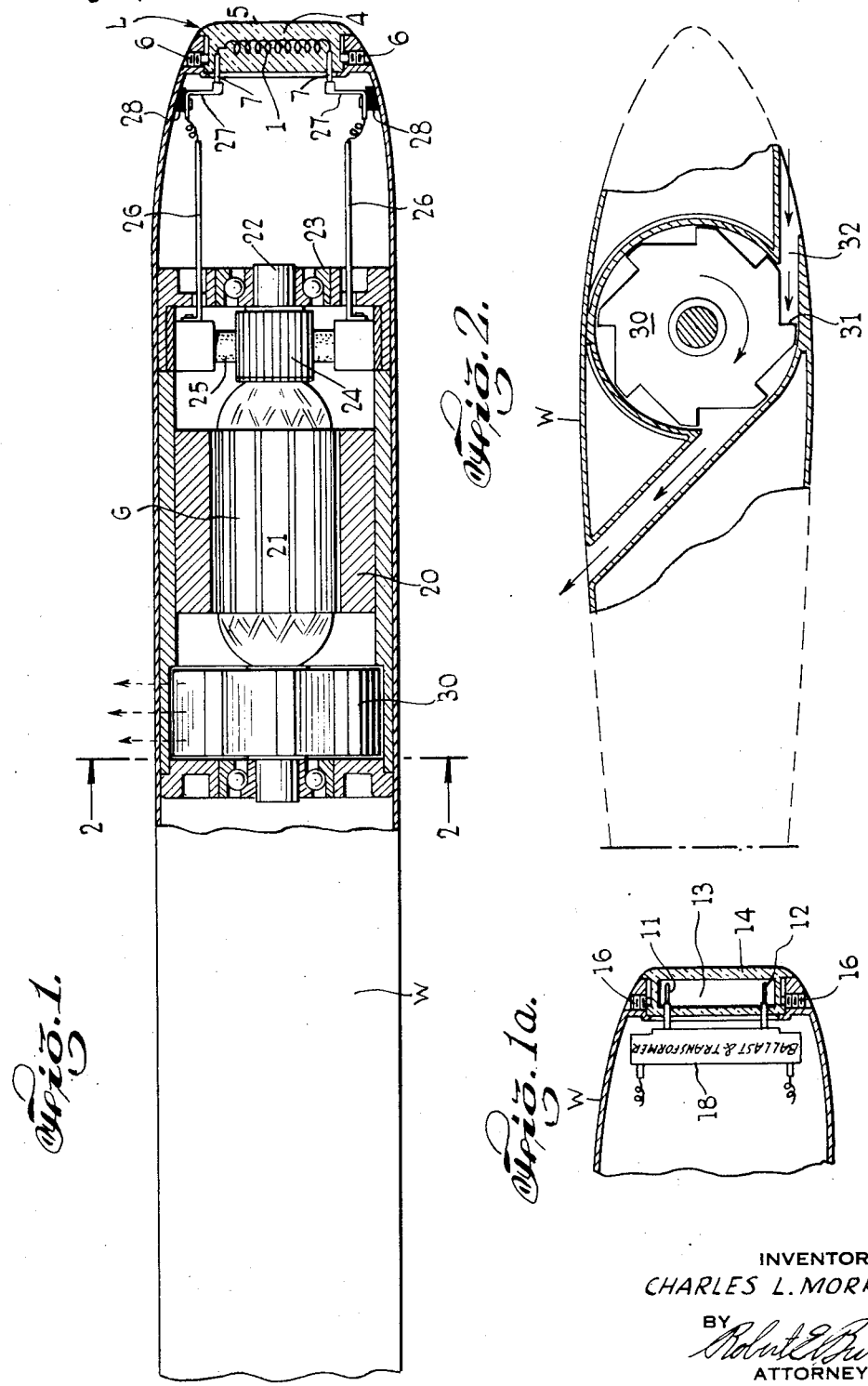

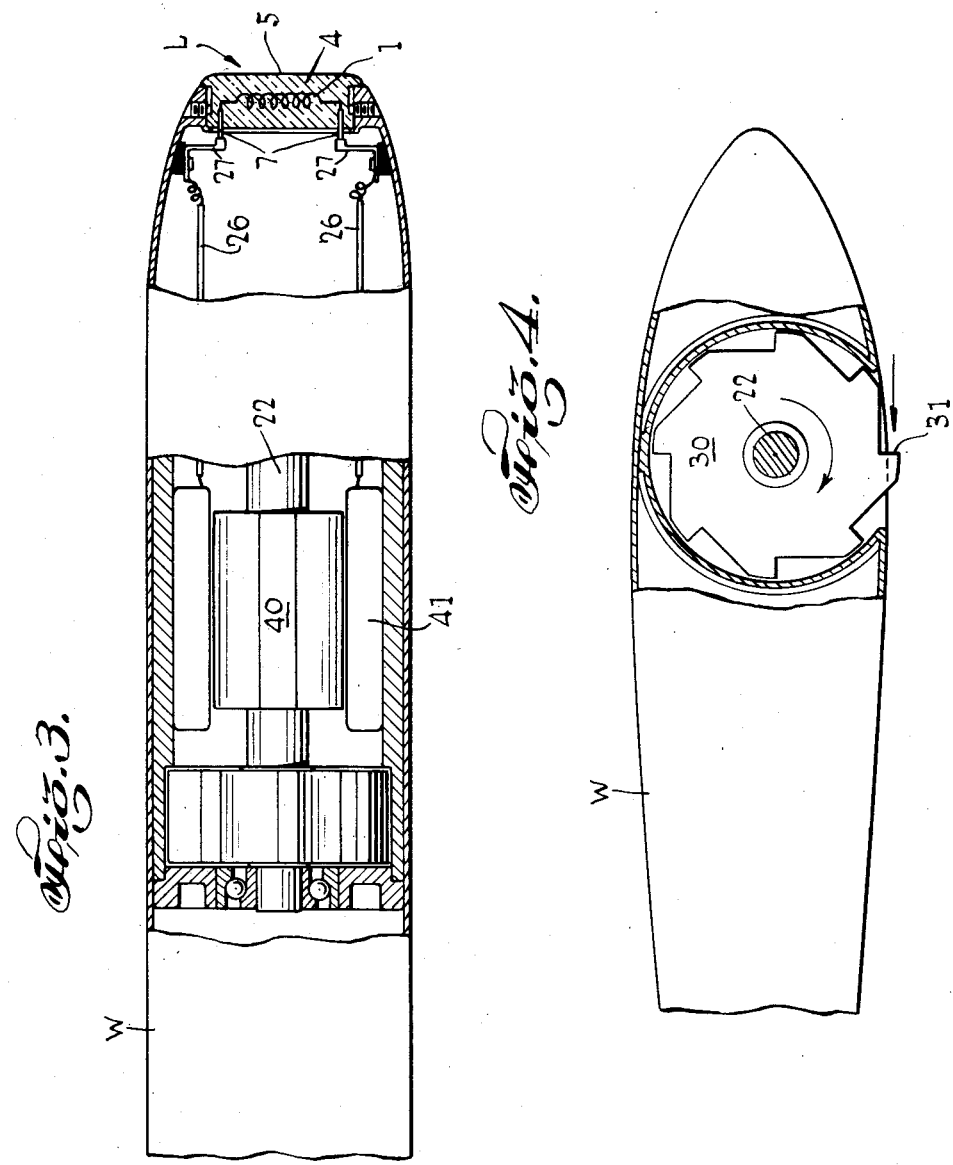

2,555,807

UNITED STATES PATENT OFFICE 2,555,807

WING TIP LIGHT FOR ROTARY WING AIRCRAFT

Charles L. Morris, Greenwich, Conn., assignor, by mesne assignments, to Gyrodyne Company of America, Inc., New York, N. Y., a corporation of New York Application August 8, 1946, Serial No. 689,100

12 Claims. (Cl. 240—7.7)

The present invention relates to the problem of providing distinctive lighting for helicopters and other rotative wing aircraft.

It is common practice to provide navigation lights on fixed wing aircraft. Such lights are commonly mounted at the tips or other desired points of the wings and are supplied with current by the usual electrical system of the plane. As the wings constitute fixed parts of the air frame, no particular difficulties or problems arise either as to the type or mounting of the lights or supplying electric current to them.

The situation is quite different with rotating wing aircraft such as helicopters. In aircraft of this type the wings are not stationary but rotate about a central axis at a high rate of speed. Moreover the wings are usually mounted in such manner as to be movable relative to the rotor shaft or a central hub carried by the shaft. For example, the wings may be rotatable about their longitudinal axes to permit changes in pitch or may be hinged or otherwise mounted to permit flapping movement. The difficulty of supplying current from a central lighting system to a light carried by a rotor wing is still further increased by reason of the space requirements of mechanism for driving and controlling the rotor wings and by the relative movement of the component parts of such mechanism. This is particularly true of helicopters having contra-rotating rotors located one above the other and driven by concentric shafts.

Further problems are introduced by the high centrifugal force acting on the wings and on anything carried by them. With presently contemplated speeds and rotor diameters, the centrifugal force at the wing tip may reach the value of 700 times the force of gravity. Any lights or other equipment carried by the wings are also subjected to other forces acting on the wing such, for example, as those resulting from gyroscopic action, from any flapping or other movement of the wing and from high air speed and vibration.

Although the problem of providing lighting for helicopters has long persisted, helicopters being one of the earliest forms of heavier-than-air aircraft proposed, no satisfactory solution has heretofore been found. It is accordingly an object of the present invention to overcome the difficulties that have beset this long felt need and to provide satisfactory and practical lighting for rotating wing aircraft. A further object of my invention is to provide rotating wing aircraft with lighting that is distinctive to this type of aircraft so that other pilots or ground observers seeing such aircraft at night will not only be apprised of the presence and position of the craft but also will immediately recognize it as being of the rotating wing type.

In accordance with my invention rotating wing aircraft is distinctively lighted by providing lights in or on the rotating wings themselves, preferably at the outer ends or tips. The lights are of such construction and mounted in such manner as not to be adversely affected by the centrifugal force and other forces acting on the wing when the aircraft is in flight. A further feature of my invention is that electric energy is supplied to the wing lights in such manner as to avoid interference with or by the rotary mounting of the wing or the means for driving and controlling the rotors. Not only does the present invention overcome the difficulty of supplying electrical energy to a light mounted on a rotating wing, but in a preferred embodiment actually utilizes the rotary movement of the wing to generate the energy. Electric generating equipment for the lights is preferably mounted in the wing itself or on a part associated with and rotating with the wing such as the rotor hub or drive shaft. By thus mounting both the light and the generating equipment on the wing or on parts that rotate together, the necessity of using slip rings or other devices for transferring electricity from a stationary to a moving part is avoided.

A further advantage of a preferred embodiment of the invention is that the light and the generating equipment for supplying current to the light are combined into a complete, self-contained unit which may be readily installed in or removed from the tip or other desired portion of the wing.

Other features, objects and advantages of the invention will become apparent from the following description, and claims in conjunction with the accompanying drawings which illustrate by way of example several embodiments and modifications of the invention.

In the drawings:

Fig. 1 is a schematic view partially in front elevation and partially in longitudinal section of a wing tip lighting unit for rotating wing aircraft, the unit being shown installed in a wing.

Fig. 1A is a fragmentary view corresponding to the right hand portion of Fig. 1 and shows another form of lighting element.

Fig. 2 is a cross section taken approximately on the line 2—2 in Fig. 1.

Figs. 3 and 4 are similar to Figs. 1 and 2 but show modifications of construction.

Fig. 5 is schematic view partly in section and partly in elevation showing another form of wing tip lighting installation in a helicopter having coaxial contra-rotating rotors.

Fig. 6 is a cross section on the line 6—6 of Fig. 5.

Fig. 7 is a view similar to Fig. 5, showing a modification.

In Figs. 1 and 2 there is shown schematically a wing tip lighting unit installed in a rotor wing. In this embodiment of my invention an electric light L and a generator or other source of electric energy G are combined in a compact self-contained unit.

The light L is shown in the form of a filament 1 embedded in a body of translucent material 4, the term "translucent" being used broadly to include transparent material as well as material that is translucent but not transparent. The light fits into or on the tip of the wing W and has a surface 5 which blends in with the aerofoil surface of the wing. The translucent material 4 may be suitably colored and may if desired be multicolored, for example by having a forward portion of red and a rearward portion of green. Where a multicolored light is used, the portions of different color may be lighted by the same filament or by separate filaments. The light is removably but securely held in place against the action of centrifugal force, for example by screw studs 6 engaging recesses in the translucent material 4. As the filament 1 is embedded in the material 4, it is supported throughout its length, and will hence not be broken either by centrifugal force or by vibration or other forces to which it is subjected when the helicopter is in flight. While the translucent material forming a part of the streamlined surface of the wing and that in which the filament is embedded are shown as being integral, it will be understood that for convenience in manufacture or other reasons, two or more separate pieces may be used. For example a wing tip portion may be molded of relatively thin translucent material and a separate lighting element may be mounted behind it. The light is provided with suitable terminals 7 for connection with a source of electrical energy.

In Fig. 1A there is shown a gaseous discharge light which may be used in place of the incandescent light shown in Fig. 1. In this embodiment electrodes 11 and 12 are provided in a space 13 formed in the translucent body portion 14 of the light which is held in place in the wing tip by screws 16. The electrodes have terminals 17 connected with a ballast element 18, through which electric energy is supplied to produce an electronic discharge between the electrodes 11 and 12 and thereby illuminate the translucent material 14. The light may be any desired type of gaseous discharge light, such as fluorescent lights or lights containing a gas such as neon, argon or helium producing characteristic illumination. As in the case of the embodiment shown in Fig. 1, the light is not deleteriously affected by centrifugal force or other forces to which it is subjected. The envelope of the gas containing space 13 may be integral with or separate from the translucent material which forms part of the aerofoil surface of the wing.

The generator G for supplying electrical energy to the light L is associated with the wing in which the light is mounted. A direct connection can thus be made from the generator to the light without the need of slip rings or other relatively moving parts. As illustrated in Fig. 1 the generator is mounted in the tip portion of the wing adjacent the light, the generator and light making up a compact assembly which, if desired, may be installed in and removed from the wing as a unit.

The generator shown in Fig. 1 comprises a field 20 and an armature 21. The field may have a winding of any desired type or may be composed of permanent magnets. The armature is carried by a shaft 22 which extends spanwise of the wing and is rotatably supported at opposite ends by ball bearings 23. The bearings are of a composite radial and thrust type to withstand the centrifugal force and other forces acting on the wing. The armature is provided with a commutator 24 engaged by brushes 25 connected by bars or other conductors 26 with clips 27 which are mounted on suitable insulating blocks 28 and are adapted to engage the terminals or contacts 7 of the light L. By mounting the light and generator immediately adjacent one another as part of a self-contained unit, it is possible to make the conductors 26 very short so that the voltage drop and energy loss between the generator and light is negligible.

The generator G is driven by an air turbine 30 mounted on the generator shaft 22. The turbine which has a plurality of vanes or pockets 31 against which a stream of air is directed by movement of the rotor wing through the air. In the embodiment shown in Figs. 1 and 2 the vanes 31 project into a passage 32 which extends from a high pressure area beneath the wing just rearwardly of the leading edge to a low pressure area above the wing.

The operation of the lighting installation shown in Figs. 1 and 2 will be readily perceivable from the structure shown and described. When the helicopter is in flight, passage of the rotor wing tip through the air causes an air stream to flow at high velocity through the passageway 32 and drive the turbine wheel 30 which in turn drives the generator G. Electric current produced by the generator flows through the conductors 26 to the light L and causes the latter to illuminate the wing tip. When the helicopter lands and the rotor is stopped the light automatically turns off. A switch may be provided if desired to turn off the light when the helicopter is flying in the daytime. However, this will ordinarily be an unnecessary and undesirable complication.

Where close voltage control for the light L is required, the field 20 of the generator is provided with a compensating winding or the speed of the generator is governor controlled, for example, by controlling flow of air through the passage 32. However, it has been found that rotor speed and hence average air speed is substantially constant and hence special voltage control devices are generally unnecessary.

The embodiment of my invention illustrated in Fig. 3 is essentially the same as that of Figs. 1 and 2 except that the generator G is of the alternating current type and has a revolving field 40 mounted on the generator shaft 22 and a stationary armature 41. Since the armature is stationary, the armature coils are connected directly to the light by the conductors 26 and the commutator shown in Fig. 1 is hence unnecessary. The unit shown in Fig. 3 is otherwise the same as that of Fig. 1 and corresponding parts are designated by the same reference numerals.

In Fig. 4 there is shown another modification of my invention in which the air passage 32 of Fig. 2 is eliminated and the air turbine wheel 30 is set so that the vanes 31 project below the adjacent lower surface of the wing and are hence subjected directly to the air flow beneath the wing. Instead of setting the generator shaft lower as shown in Fig. 4, the lower surface of the wing can be recessed adjacent the turbine wheel to provide a chordwise-extending channel into which the vanes project.

Figs. 5 and 6 illustrate diagrammatically a further embodiment of my invention in which an electric light carried by a rotor wing of a helicopter is supplied with electric energy by a generator which is associated with the rotor and is driven by rotation of the rotor. However, in this instance the generator is driven mechanically by the rotor shaft rather than being air driven as illustrated in Figs. 1, 2, 3, and 4. The lighting installation of Figs. 5 and 6 is shown in conjunction with a helicopter of the type having coaxial drive shafts. The upper rotor 43 is mounted on and rotates with an inner drive shaft 44. The lower rotor 45 is mounted on and rotates with an outer drive shaft 46, an extension 46X of which extends up to a point adjacent the upper rotor. Suitable anti-friction bearings 49 are provided between the two drive shafts. Each of the rotors comprises a hub 47, 48 and one or more wings W. The rotor shafts and hence the rotors are driven in opposite directions by one or more engines acting through suitable transmissions (not shown). The rotors are also provided with control mechanism, for example, mechanisms for varying the lift and drag of the rotor wings both cyclically and non-cyclically to provide azimuthal control, to control the ascent and descent of the helicopter and to turn it about a vertical axis to steer it. In order to simplify the drawings, this control mechanism has been omitted.

Lights L are provided on the wings of the upper rotor 43 and the lower rotor 45. The lights may be the same as illustrated in Figs. 1 or 1A or of other desired type and are shown diagrammatically. Electricity for the lights L is supplied by a generator G located between the two rotors and associated with the rotor drive shafts. The generator G comprises a field 50 mounted inside of and carried by the extension 46X of the outer drive shaft 46 and an armature 51 carried by the inner drive shaft 44. The armature 51 thus rotates with one rotor and the field rotates with the other. As the rotors turn in opposite directions the relative speed of rotation of the armature and field is twice the speed of the rotors.

One terminal of the armature winding is connected by a conductor 52 with one terminal of the light L of the upper rotor. The opposite terminals of the armature winding and of the light are connected by a second conductor or are connected to ground as shown. As the upper rotor 43, the drive shaft 44 and the armature 51 all rotate together no commutator or slip rings are necessary. The connections are direct.

The armature winding is also connected with one or more lights L of the lower rotor 45 through conductors 53 and 54, with a return through ground. As the lower rotor turns in the opposite direction to the inner drive shaft that carries the rotor, it is necessary to provide a rotating connection between the conductors 53 and 54. As illustrated in more detail in Fig. 6 the conductor 53 leading from the generator extends out through the inner shaft 44 and is connected with a slip ring 55 mounted on and insulated from said shaft. This slip ring is engaged by a spring contact or brush 56 which is carried by and insulated from the outer drive shaft and is connected with the conductor 54 leading to the light.

As it is ordinarily adequate to light only one rotor of a coaxial rotor helicopter, the lighting circuit for the lower rotor may be omitted and the use of the slip ring 55 thus avoided. Alternatively the use of slip rings can be avoided while still providing lights on both rotors by the arrangement shown in Fig. 7. In this embodiment there is provided a composite or dual generator comprising a field 60 carried by the outer drive shaft 46 and an armature 61 carried by the inner drive shaft 44 and also a field 62 carried by the inner drive shaft 44 and an armature 63 carried by the outer drive shaft 46. The armature winding 61 is connected by a conductor 64 with the light or lights of the upper rotor 43, return being through another conductor or through ground. The armature winding 63 is connected by a conductor 65 with the light or lights of the lower rotor 45, return being through another conductor or through ground as shown in the drawings. As the generator armature 61 rotates with the upper rotor 43 while the generator armature 63 rotates with the lower rotor 45, direct connections are made in each instance without the use of slip rings or similar devices. While the two armatures and two fields of the composite generator have been shown axially separated for clarity of illustration, they may, if desired, be consolidated into a more compact unit. The fields preferably comprise high retentivity permanent magnets. Although the embodiment of my invention illustrated in Fig. 5 is shown and described in conjunction with a helicopter of the coaxial rotor type, it will be readily apparent that the arrangement for lighting the upper rotor is equally applicable to a single rotor helicopter. In this case the armature is carried in like manner by the rotor shaft or other part rotating with the rotor while the field is mounted on a stationary shaft or column corresponding to the shaft 46X of Fig. 5.

It will be understood that in carrying out my invention lights may be mounted on all wings of the rotor or rotors of a helicopter or other aircraft or only on a selected wing or wings. While the lights have been illustrated in the tips of the wings, this being the preferred location, they can, if desired, be mounted farther inboard. In this event, the translucent material of the light is differently shaped so as to fit into the surface of that portion of the wing where it is installed. Moreover, in the embodiments illustrated in Figs. 1 and 3 the generators and lights may be mounted in different portions of the wing rather than in juxtaposition.

As the invention is of wide scope and capable of many applications and modifications no attempt has been made to show all possible forms that the invention might take, the specification and drawings being directed to typical and preferred embodiments which will enable those skilled in the art to understand and practice the invention. Features of the several embodiments of my invention illustrated in the drawings are mutually interchangeable. For example, lights of Figs. 1 and 1A, the generators of Figs. 1 and 3 and the air turbines of Figs. 2 and 4 may be substituted for corresponding elements in other embodiments as desired. Moreover the generator may be driven by an axial flow air turbine or propeller as well as by a radial or peripheral flow turbine. If, in the embodiments of Figs. 2, 5, or 7 higher voltage is desired than that initially generated, suitable transformers, well known in the art, may be employed. As many other modifications of my invention may be made within the scope of the appended claims there is no intention to limit the invention to the specific embodiments illustrated by way of example in the drawings.

What I claim and desire to secure by Letters Patent is:

1. In rotary wing aircraft, the combination of a rotating wing, an electric light carried by said wing, an air turbine disposed in said wing and driven by air currents resulting from rotation of said wing, an electric generator disposed inside the wing and driven by said turbine, and electrical connections for conducting current from said generator to said light continuously throughout the complete circle of rotation of said wing.

2. In rotary wing aircraft, the combination of a rotating shaft, a load carrying wing supported by and rotatable with said shaft, an electric light on said wing, an electric generator associated with said shaft and driven by the rotation thereof, and electrical connections for conducting current from said generator to said light.

3. In rotary wing aircraft, the combination of a pair of coaxial, contra-rotating shafts, a load carrying wing supported by and rotatable with each of said shafts, an electric light on at least one of said wings, an electric generator having relatively rotatable parts associated respectively with said shafts, said generator being driven by the relative rotation of said shafts, and electrical connections for conducting current from said generator to said light.

4. In rotary wing aircraft, the combination of a rotating wing, a body of translucent solid material carried by said wing, and held against displacement by centrifugal force or other forces acting on said body when said wing is rotated, a filament embedded in said solid translucent material, and means associated with said wing and rotating therewith for supplying electric current to said filament to heat it to incandescence.

5. In rotary wing aircraft, the combination of a rotating wing, a gaseous discharge light carried by said wing, means associated with said rotating wing and rotating therewith for generating electric current, and electrical connections for conducting electric current from said generator to said light.

6. A wing tip lighting unit for aircraft, comprising a translucent wing tip portion having exposed surface blending with the airfoil contour of the wing, an electric light for illuminating said translucent portion, an air driven electric generator disposed in said wing adjacent said tip portion and driven by passage of said wing tip through the air, and electrical connections for conducting current from said generator to said light continuously throughout the complete circle of rotation of said wing.

7. In rotary wing aircraft the combination of a pair of coaxial, contra-rotating drive shafts, a load carrying wing supported by and rotatable with each of said shafts, an electric light on at least one wing of each rotor, an electric generator having relatively rotatable parts associated respectively with said shafts including a current generating coil rotating with each of said rotor shafts and electrical connection for conducting current from each of said coils respectively to a light carried by the rotor with the drive shaft of which said coil rotates.

8. In rotary wing aircraft, the combination of a rotary wing, an electric light carried adjacent the tip of the wing, the wing having a passageway therein extending from an area of high pressure to an area of low pressure, a turbine powered electric generator positioned within the wing and having turbine blades operatively positioned in said passageway, whereby the turbine is rotated by air currents set up by the rotation of the wing and electrical connections for conducting current from said generator to said light continuously throughout the complete circle of rotation of said wing.

9. In rotary wing aircraft, the combination of a rotary wing, an electric light carried adjacent the tip of the wing, the rotary wing having a passageway extending from a forward to a rearward portion thereof, and a turbine powered electric generator positioned within the wing and having turbine blades operatively positioned in said passageway, whereby upon rotation of the wing air is forced through the opening to operate the turbine generator to generate electricity and electrical connections for conducting current from said generator to said light continuously throughout the complete circle of rotation of said wing.

10. In rotary wing aircraft, the combination of a rotary wing, an electric light carried adjacent the tip of the wing, the rotary wing having an opening extending into the air flow, a turbine powered electric generator positioned within the wing and connected to the light and having turbine blades operatively extending from the opening, whereby the turbine is rotated by air currents set up by the rotation of the wing.

11. In a rotary wing aircraft, a rotating wing having a tip portion, an electric light in the tip portion of the wing, and means continually supplying electric current to said light throughout the complete circle of rotation of said wing comprising a shaft rotatably mounted inside the tip portion of the wing and extending spanwise of said wing, radial and axial thrust bearings rotatably supporting said shaft against radial loads and against axial loads produced by the centrifugal force resulting from rotation of said wing, an electric generator enclosed within said tip portion of the wing including a rotor mounted on said shaft, electrical connections between the generator and the light, an air turbine including a rotor mounted on said shaft and a passage extending transversely of said wing from an area of high pressure to an area of low pressure, the rotor of said turbine being disposed to project into said passageway so as to be driven by air flowing through said passageway as a result of the rotation of the rotary wing.

12. In rotary wing aircraft, a rotating wing having a tip portion, an electric light in the tip portion of said wing and means continually supplying electric current to said light throughout the complete circle of rotation of the wing comprising a shaft rotatably mounted inside the wing, radial and axial thrust bearings rotatably supporting said shaft against radial loads and against axial loads produced by centrifugal force resulting from rotation of said wing, an electric generator enclosed within the wing including a rotor mounted on said shaft, electrical connections between the generator and the light, an air turbine including a rotor mounted on said shaft and having a plurality of blades, said wing having portions adjacent said turbine shaped to direct a stream of air against the rotor blades to drive said turbine upon rotation of said rotary wing.

CHARLES L. MORRIS.

REFERENCES CITED

The following references are of record in the file of this patent:

UNITED STATES PATENTS

| Number | Name | Date |
|---|---|---|
| 1,504,085 | Birrell | Aug. 5, 1924 |
| 1,528,754 | Bresson | Mar. 10, 1925 |
| 1,607,562 | Potter | Nov. 16, 1926 |
| 1,955,603 | Lamblin-Parent | Apr. 7, 1934 |
| 1,982,960 | Link | Dec. 4, 1934 |
| 2,337,744 | Garstang | Dec. 28, 1943 |
| 2,375,075 | Carruth | May 1, 1945 |
| 2,423,528 | Stewart | July 8, 1947 |